(12) United States Patent
Witt et al.

(10) Patent No.: US 8,283,389 B2
(45) Date of Patent: Oct. 9, 2012

(54) METHODS OF MANUFACTURE OF POLYLACTIC ACID FOAMS

(75) Inventors: Michael Ralph Juergen Witt, Rotorua (NZ); Samir Shah, Rotorua (NZ)

(73) Assignee: Biopolymer Network Limited, Canterbury (NZ)

( * ) Notice: Subject to any disclaimer, the term of this patent is extended or adjusted under 35 U.S.C. 154(b) by 282 days.

(21) Appl. No.: 12/449,098

(22) PCT Filed: Jan. 30, 2008

(86) PCT No.: PCT/IB2008/050321
§ 371 (c)(1),
(2), (4) Date: Aug. 18, 2009

(87) PCT Pub. No.: WO2008/093284
PCT Pub. Date: Aug. 7, 2008

(65) Prior Publication Data
US 2010/0029793 A1    Feb. 4, 2010

(30) Foreign Application Priority Data
Jan. 30, 2007   (NZ) ........................................ 552936

(51) Int. Cl.
C08J 9/18    (2006.01)
C08L 67/04    (2006.01)

(52) U.S. Cl. ............ 521/56; 521/60; 521/172; 521/182; 521/189

(58) Field of Classification Search ............... 521/56, 521/60, 172, 182, 189
See application file for complete search history.

(56) References Cited

U.S. PATENT DOCUMENTS

| 6,310,171 B1 | 10/2001 | Naito et al. |
| 6,328,916 B1 | 12/2001 | Nishikawa et al. |
| 2006/0167122 A1 * | 7/2006 | Haraguchi et al. .............. 521/60 |
| 2007/0032577 A1 * | 2/2007 | Kanzawa et al. ............... 524/31 |

FOREIGN PATENT DOCUMENTS

| EP | 1 378 538 A1 | 1/2004 |
| JP | 2000-136261 A2 | 5/2000 |
| JP | 2002020525 A * | 1/2002 |
| JP | 2003-73495 | 3/2003 |
| JP | 2003064213 A * | 3/2003 |
| JP | 2003073496 A * | 3/2003 |
| JP | 2005-264166 A | 9/2005 |
| WO | WO2004/087812 | * 10/2004 |

OTHER PUBLICATIONS

International Preliminary Report on Patentability, PCT International Application No. PCT/IB2008/050321, filed Jan. 30, 2008 (5 pgs).
International Search Report for PCT/IB2008/050321, mailed May 16, 2008.
Written Opinion of the International Searching Authority for PCT/IB2008/050321, mailed May 16, 2008.

* cited by examiner

Primary Examiner — Irina S Zemel
(74) Attorney, Agent, or Firm — Nixon & Vanderhye

(57) ABSTRACT

Method of forming a composition comprising impregnated polylactic acid (PLA) resin beads, by impregnating PLA resin beads with $CO_2$. The method is carried out by contacting the beads with liquid $CO_2$, and holding the impregnated beads at a temperature and pressure that prevents the beads from foaming while allowing the level of impregnated $CO_2$ to reduce to about 4 to 20 weight % relative to the total weight of the beads and $CO_2$.

25 Claims, No Drawings

METHODS OF MANUFACTURE OF POLYLACTIC ACID FOAMS

This application is the U.S. national phase of International Application No. PCT/IB2008/050321 filed 30 Jan. 2008, which designated the U.S. and claims priority to NZ Application No. 552936 filed 30 Jan. 2007, the entire contents of each of which are hereby incorporated by reference.

FIELD OF THE INVENTION

The invention relates to a method of producing moulded foam products from polylactic acid ("PLA") polymer. The invention also relates to pre-expanded PLA beads, impregnated PLA beads and the products made from such.

BACKGROUND OF THE INVENTION

There are polymer foams used for insulation and packaging applications with good performance to price ratio. But because these forms are petroleum-derived, there is increasing environmental and consumer demand for using biofoams—biologically derived foams—for some applications.

PLA is a 'green plastic' being bio-derived and bio-degradable. A useful blowing agent, carbon dioxide, is a 'green' blowing agent because it has no ozone depletion potential and a tiny global warming potential. A number of attempts have been made to develop a process for foaming PLA in order to provide a green alternative to materials such as polystyrene foam (expanded polystyrene/EPS). Because of a small processing window and the theological properties of the PLA polymer melt, many of these processes were unsuccessful or unsatisfactory. The processes that were to some extent successful often required complex processes and/or additives such as nucleating agents to improve the foaming and the fusing parts of the process. See for example United States patent publication US 2006-0167122 that reports that use of a nucleating agent is necessary.

There are a number of reported processes that use carbon dioxide as a blowing agent including uses in relation to PLA. Reported PLA foaming and moulding processes using PLA resin beads impregnated with carbon dioxide generally involve impregnating the beads with gaseous or supercritical $CO_2$, pre-expanding the impregnated beads, resting and sometimes treating the pre-expanded beads, before re-impregnating them with more $CO_2$ or another blowing agent and further expanding and fusing them in a mould. See for example European patent application EP 1 378 538 that reports use of blends comprising predominantly crystalline PLA that require re-impregnation with blowing agent before moulding.

It is an object of the present invention to provide a simple method of foaming PLA resin beads or to at least provide the public with a useful choice.

SUMMARY OF THE INVENTION

Accordingly, a first aspect of the present invention relates to a method of forming a composition of expanded polylactic acid (PLA) resin beads, the method comprising impregnating PLA resin beads with $CO_2$ by contacting the beads with liquid $CO_2$; and holding the impregnated beads at a temperature and pressure that prevents the beads from foaming while allowing the level of impregnated $CO_2$ to reduce to about 5 to 18 weight % relative to the total weight of the beads and $CO_2$. Preferably the method further comprises pre-expanding the beads at a pre-expansion temperature. Promptly following pre-expansion or after a desired storage period, the method may further comprise introducing the pre-expanded beads into a mould and further expanding and fusing the beads in the mould by application of a temperature greater than the temperature used for pre-expansion.

A second aspect of the present invention relates to a method of manufacturing a moulded polylactic acid (PLA) product, the method comprising impregnating PLA resin beads with $CO_2$ by contacting the beads with liquid $CO_2$; holding the impregnated beads at a temperature and pressure that prevents the beads from foaming while allowing the level of impregnated $CO_2$ to reduce to about 5 to 18 weight % relative to the total weight of the beads and $CO_2$; pre-expanding the beads at a pre-expansion temperature; introducing the pre-expanded beads into a mould; and further expanding and fusing the beads in the mould by application of a temperature greater than the temperature used for pre-expansion.

A third aspect of the present invention relates to a method of forming a composition of expanded polylactic acid (PLA) resin beads, the method comprising
(1) providing a composition of impregnated PLA beads prepared by a process comprising
  (a) impregnating PLA resin beads with $CO_2$ by contacting the beads with liquid $CO_2$;
  (b) holding the impregnated beads at a temperature and pressure that prevents the beads from foaming while allowing the level of impregnated $CO_2$ to reduce to about 5 to 18 weight % relative to the total weight of the beads and $CO_2$; and
(2) pre-expanding the beads at a pre-expansion temperature.

As described above, the method may further comprise optionally storing the beads in a pre-expanded state. Alternatively, promptly following pre-expansion or after a desired storage period, the method may further comprise introducing the pre-expanded beads into a mould and further expanding and fusing the beads in the mould by application of a temperature greater than the temperature used for pre-expansion.

A fourth aspect of the present invention relates to a method of manufacturing a moulded polylactic acid (PLA) product, the method comprising
(1) providing a composition of impregnated PLA beads prepared by a process comprising
  (a) impregnating PLA resin beads with $CO_2$ by contacting the beads with liquid $CO_2$; and
  (b) holding the impregnated beads at a temperature and pressure that prevents the beads from foaming while allowing the level of impregnated $CO_2$ to reduce to about 5 to 18 weight % relative to the total weight of the beads and $CO_2$;
(2) pre-expanding the beads at a pre-expansion temperature;
(3) introducing the pre-expanded beads into a mould; and
(4) further expanding and fusing the beads in the mould by application of a temperature greater than the temperature used for pre-expansion A fifth aspect of the present invention relates to a $CO_2$ impregnated PLA resin bead having a $CO_2$ wt % of about 5 to 18% manufactured by immersing a PLA resin bead in liquid $CO_2$ until equilibrium then storing the bead in refrigerated conditions until the $CO_2$ level drops to about 5 to 18%, about 5 to 12%, or about 8 to 12% by weight. Preferably the bead is stored until the $CO_2$ level drops to about 5 to 18%, more preferably about 5 to 12%, and most preferably about 8 to 12% by weight.

A sixth aspect of the present invention relates to a pre-expanded $CO_2$ impregnated PLA resin bead manufactured by immersing an PLA resin bead in liquid $CO_2$ until equilibrium then storing the bead in refrigerated conditions until the $CO_2$ wt % level drops to the about 5 to 18% by weight then pre-expanding the bead under ambient pressure and a temperature of about 20-110° C. or about 50-110° C.

A seventh aspect of the present invention relates to a moulded product made from fused expanded PLA resin beads manufactured by an aspect of the invention described above, such as immersing PLA resin bead in liquid $CO_2$ until equilibrium, storing the bead in refrigerated conditions until the $CO_2$ level drops to about 5% to 18% by weight, pre-expanding the bead at a pre-expansion temperature, immediately transferring the pre-expanded beads to a mould, and further expanding and fusing together the beads by application of a temperature greater than that used for pre-expansion. Preferred moulded products include moulded blocks and shaped moulded products, especially blocks adapted to form packing material. Other preferred moulded products include convenience items such as containers including clamshell containers, pots, boxes, bowls, cups, plates and trays.

An eighth aspect of the present invention relates to a method of manufacturing a moulded polylactic acid (PLA) product, the method comprising impregnating PLA resin beads with $CO_2$ by contacting the beads with liquid $CO_2$; holding the impregnated beads at a temperature and pressure that prevents the beads from foaming while allowing the level of impregnated $CO_2$ to reduce to about 5 to 18 weight % relative to the total weight of the beads and $CO_2$; pre-expanding the beads at a pre-expansion temperature; introducing the pre-expanded beads into a mould; and further expanding and fusing the beads in the mould by application of a temperature lower than or equal to the temperature used for pre-expansion.

Any of the following embodiments may relate to any of the aspects described above or below.

In one embodiment impregnation is conducted by contacting the PLA resin beads with liquid $CO_2$, preferably immersing the PLA resin beads in liquid $CO_2$, until the absorption of $CO_2$ by the beads reaches equilibrium. The amount of $CO_2$ adsorbed by the beads at equilibrium will depend on the nature of the PLA beads and the impregnation pressure and temperature. The amount of $CO_2$ adsorbed by the beads at equilibrium may be determined experimentally by determining the maximum amount of $CO_2$ that a selected population of beads will adsorb at a desired pressure or temperature.

In one embodiment impregnation is conducted until the percentage of $CO_2$ absorbed by the beads is at least about 18, 19, 20, 21, 22, 23, 24, 25, 26, 27, 28, 29, 30, 31, 32, 33, 34 or 35% by weight relative to the weight of the $CO_2$ and the beads, and useful ranges may be selected between any of these values (for example, about 18-35%). In some embodiments impregnation is conducted in a pressure vessel and the temperature and pressure in the pressure vessel during impregnation is selected so that the percentage of $CO_2$ absorbed by the beads is about 18-35% by weight relative to the weight of the $CO_2$ and the beads. Preferably, the temperature and pressure in the pressure vessel during impregnation is selected so that, in combination with the type and grade of PLA resin beads, the percentage of $CO_2$ absorbed in the beads is about 18-35% by weight.

In one embodiment impregnation is conducted by contacting the PLA resin beads with liquid $CO_2$ at a pressure of at least about 1, 2, 3, 4, 5, 6, 7, 8, 9 or 10 MPa, and useful ranges may be selected between any of these values (for example, about 1 to 10, 2 to 10, 3 to 10, 4 to 10, 5 to 10, 6 to 10, 7 to 10, 8 to 10, 1 to 8, 2 to 8, 3 to 8, 4 to 8, 5 to 8, 6 to 8, or 7 to 8 MPa). In one embodiment impregnation is conducted by contacting the PLA resin beads with liquid $CO_2$ at a temperature of at least about 2, 3, 4, 5, 6, 7, 8, 9, 10, 11, 12, 13, 14, 15, 16, 17 or 18° C., and useful ranges may be selected between any of these values (for example, about 2-18, 3-17, 4-16, 5-15, 6-14, 7-13, 8-12 or 9-11° C.). In one embodiment impregnation is conducted by contacting the PLA resin beads with liquid $CO_2$, preferably by immersing the PLA resin beads in liquid $CO_2$, at a pressure of about 5-8 MPa and a temperature of about 5-15° C. In another embodiment impregnation is conducted by contacting the PLA resin beads with liquid $CO_2$ at a pressure of about 5-8 MPa and a temperature of about 8-12° C. In another embodiment impregnation is conducted by contacting the PLA resin beads with liquid $CO_2$ at a pressure of about 5.5-6.5 MPa and a temperature of about 5-15° C. In another embodiment impregnation is conducted by contacting the PLA resin beads with liquid $CO_2$ at a pressure of about 5.5-6.5 MPa and a temperature of about 8-12° C. In one preferred embodiment the liquid $CO_2$ is not mixed with any dispersion medium during impregnation. In one embodiment impregnation is conducted for at least about 10, 20, 30, 40, 50, 60, 70, 80, 90, 100, 110, 120, 130, 140, 150, 160, 170, 180, 190, 200, 210, 220, 230 or 240 minutes, or 1, 2, 3, 4, 5, 6, 7, 8, 9, 10, 11, 12, 13, 14, 15, 16, 17, 18, 19, 20, 21, 22, 23 or 24 hours, and useful ranges may be selected between any of these values (for example, about 10 to 240, 10 to 200, 10 to 150, 10 to 100, 20 to 240, 20 to 200, 20 to 150, or 20 to 100 minutes, or 1-24, 2-23, 3-22, 4-21, 5-20, 6-18, 7-17, 8-16, 9-15 or 10-14 hours). For example, in one embodiment, a low impregnation pressure (e.g. up to about 5 MPa) is used with a long impregnation time (e.g. at least about 4 hours) or a high impregnation pressure (e.g. at least about 5 MPa) is used with a short impregnation time (e.g. up to about 4 hours).

In one embodiment, following impregnation of the beads the pressure is reduced to ambient pressure and the beads are held under refrigerated conditions. Preferred refrigerated conditions include holding by storage at about or at less than about 8, 6, 4, 2, 0, −2, −4, −6, −8, −10, −12, −14, −16, or −18° C. In one embodiment, following impregnation the PLA resin beads are held in refrigerated conditions until the $CO_2$ wt. % decreases to about 20, 19, 18, 17, 16, 15, 14, 13, 12, 11, 10, 9, 8, 7, 6, 5, or 4%, preferably about 4-20%, 5-18%, 5-12%, or 8-12% by weight. In one embodiment the beads are held for at least about 1, 2, 3, 4, 5, 6, 7, 8, 9, 10, 11, 12, 13, 14, 15, 16, 17, 18, 19, 20, 21, 22, 23, 24, 30, 36, 42, 48, 54, 60, 66, 72, 78, 84, 90 or 96 hours, and useful ranges may be selected between any of these values (for example, about 1-24, 2-23, 3-22, 4-21, 5-20, 6-18, 7-17, 8-16, 9-15 or 10-14 hours).

In one embodiment pre-expanding the beads comprises applying suitable temperatures to initiate the nucleation and growth of gas pores. In one embodiment pre-expanding the beads is conducted at ambient pressure. In another embodiment pre-expanding the beads is conducted at a pre-expansion temperature of about 19 to 110° C., about 19 to 71° C., or about 49 to 71° C. In one embodiment pre-expanding the beads is conducted by heating the beads to the pre-expansion temperature for at least about 1, 5, 10, 20, 30, 40, 50, 60, 70, 80, 90, 100, 110, 120, 130, 140, 150, 160, 170, 180, 190, 200, 210, 220, 230 or 240 seconds, and useful ranges may be selected between any of these values (for example, about 5 to 240, 5 to 200, 5 to 150, 5 to 120, 5 to 100, 10 to 240, 10 to 200, 10 to 150, 10 to 120, 10 to 100, 20 to 240, 20 to 200, 20 to 150, 20 to 120, or 20 to 100 seconds).

The further expanding (foaming) and fusion of the beads in a mould is conducted at a temperature (the moulding temperature) greater than that used in pre-expansion. In one embodiment the foaming and fusion of the beads in a mould is conducted by the application of steam. In another embodiment the foaming and fusion of the beads in a mould is conducted by the application of steam and vacuum. In one embodiment the beads are subjected to the moulding temperature for at least about 10, 20, 30, 40, 50, 60, 70, 80, 90, 100, 110, 120, 130, 140, 150, 160, 170, 180, 190, 200, 210, 220, 230 or 240 seconds, and useful ranges may be selected between any of these values (for example, about 10 to 240, 10 to 200, 10 to 150, 10 to 100, 20 to 240, 20 to 200, 20 to 150, or 20 to 100 seconds). In one embodiment the moulding temperature is at least about 40, 50, 60, 70, 80, 90, 100, 110 or 120° C., and useful ranges may be selected between any of these values (for example, about 40-120, 50-110, 60-100, or 70-90° C.). In one embodiment a vacuum is applied to the mould for at least about 1, 5, 10, 20, 30, 40, 50, 60, 70, 80, 90, 100, 110, 120, 130, 140, 150, 160, 170, 180, 190, 200, 210, 220, 230 or 240 seconds, or 1, 2, 3, 4, 5, 6, 7, 8, 9, 10, 11, 12, 13, 14, 15, 16, 17, 18, 19, 20, 21, 22, 23 or 24 minutes, and useful ranges may be selected between any of these values (for example, about 1 to 240, 1 to 200, 1 to 150, 1 to 100, 1 to 50, 1 to 10, 10 to 240, 10 to 200, 10 to 150, 10 to 100, 10 to 50, 20 to 240, 20 to 200, 20 to 150, or 20 to 100 seconds, or 1-15, 2-14, 3-13 or 4-12 minutes).

In one embodiment, the further expanding and fusion of the beads in a mould is conducted at a temperature lower than or equal to that used in pre-expansion.

In one embodiment the PLA resin beads comprise at least about 50, 60, 70, 80, 90, 95, 99 or 100% PLA by weight. In another embodiment the beads comprise amorphous PLA. In another embodiment the beads comprise at least about 50, 60, 70, 80, 90, 95, 99 or 100% amorphous PLA by weight. In another embodiment the beads comprise a blend of amorphous PLA and crystalline PLA, preferably about 50, 60, 70, 80, 90, 95 or 99% amorphous PLA and about 1, 5, 10, 20, 30, 40, or 50% crystalline PLA.

In another embodiment, the beads comprise a blend of PLA and aliphatic polyester or ethylene-vinyl-acetate (EVA), preferably about 80, 85, 90, 95 or 99% PLA and about 1, 5, 10, 15, or 20% aliphatic polyester or EVA. Preferably the aliphatic polyester is Bionelle™ (Showa Denko K.K., Japan).

In one embodiment the PLA resin beads comprise a filler. In one embodiment the fillers are inert and biodegradable. Suitable fillers include but are not limited to talc, calcium carbonate, calcium stearate, sand, clay, zeolite, bark (including pine bark), sawdust, borax, zinc borate, aluminium hydroxide, or any mixture of any two or more thereof. Preferred fillers include talc, calcium carbonate, clay, zeolite, bark (including pine bark), or any mixture of any two or more thereof In one embodiment the beads comprise about 1, 5, 10, 15, 20 or 25% filler.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means consisting at least in part of that is to say the feature or component that something is said to consist of will be present but other features or components may also be present. Related terms such as "comprise" and "comprised" are to be interpreted in the same manner.

DETAILED DESCRIPTION

The advantages of present invention include that it is a simple process, that it allows the impregnated unfoamed beads to be stored and/or transported, that doesn't require a second re-impregnation step and that can be utilized as a 'drop-in' technology using much of an existing Expanded Polystyrene foam plant and equipment for pre-expansion and moulding and that it uses and produces 'green' products. Various aspects and embodiments of the method of the invention are described above.

Polylactic acid or PLA is a polymer or copolymer comprising, consisting essentially of or consisting of lactic acid monomer units. For the purposes of the present invention references to polylactic acid includes homo-isomeric, hetero-isomeric, crystalline and amorphous polymers and mixtures of the aforestated. The PLA resin beads may comprise about 50-100% PLA by weight, including at least about 50, 60, 70, 80, 90, 95, 99 or 100% PLA by weight. The PLA may comprise amorphous PLA or a blend of amorphous PLA and crystalline PLA. Preferred blends comprise at least about 50, 60, 70, 80, 90, 95, 99 or 100% amorphous PLA by weight and about 0-50% crystalline PLA by weight, including at least about 0, 1, 5, 10, 20, 30, 40 or 50% crystalline PTA by weight. The lactic acid in the resin beads may comprise one or more lactic acid isomers including L-lactic acid, D-lactic acid or DL-lactic acid. Preferably the lactic acid is L-lactic acid. PLA is produced industrially by polymerization of lactic acid obtained by the bacterial fermentation of biomass such as beet, sugarcane, cornstarch or milk products.

The PLA may also be blended with other additives, fillers or polymers. It should be noted that the process when utilized using industrially practical temperature and pressure ranges, is less effective when applied to highly crystalline grades. In one embodiment the PLA resin beads comprise a filler. Suitable fillers are known in the art and may be identified by a skilled worker with regard to that skill and the teachings of this specification. Preferred fillers are inert and biodegradable. In one embodiment fillers include but are not limited to talc, calcium carbonate, calcium stearate, sand, charcoal, clay, zeolite, bark (including pine bark), sawdust, borax, zinc borate, aluminium hydroxide, or any mixture of any two or more thereof. Preferred fillers are talc, calcium carbonate, clay, zeolite, bark (including pine bark), or any mixture of any two or more thereof.

Most known impregnation techniques for PLA use gaseous or supercritical $CO_2$. However, these have disadvantages over the present invention. In regard to supercritical $CO_2$ impregnation higher pressures are required (supercritical conditions require at least 7.4 MPa and 31° C.) and, further, the individual PLA granules tend to fuse into a single lump during impregnation as the $CO_2$ behaves as a very efficient plasticizer, thus lowering the glass transition temperature (Tg) of the PLA. Reducing the pressure after impregnation, due to the size of the pressure reduction, can cause an instantaneous foaming of the impregnated granules while still in the reactor resulting in one big lump unless temperatures also are greatly reduced. In regard to gas phase impregnation, gas conditions generally require much longer time frames to achieve equilibrium $CO_2$ concentrations compared to supercritical and liquid impregnations. In addition, particles still have a profound tendency to stick together during impregnation. After impregnation it is difficult to separate the agglomerates into individual granules.

In liquid $CO_2$ impregnation the beads have little tendency to stick to each other. Liquid impregnation requires moderate temperature and pressure, e.g. 5 to 15° C. and preferably 10° C. and 5 to 8 MPa, preferably 6 MPa, and yields high $CO_2$ concentrations in the PLA granules, typically around 30% by weight (30 wt. %) and usually in the range of 18-35% by weight. Despite the high loading, the beads do not stick together and after releasing the pressure from the impregnation reactor they can be handled as a bulk commodity.

Commercially available PLA resin beads can be impregnated without any pre-treatment using liquid $CO_2$. Amorphous, crystalline, and amorphous-crystalline blends may be used but results with highly crystalline grades are sometimes of lesser quality at the preferred pressure and temperature ranges. Reference to resin "beads" generally means the crude resin material (often in the form of pellets) obtained from manufacturers and the terms beads, granules and pellets may be used interchangeably. Beads may be resized by extrusion and billing of the commercially available material using known techniques.

A preferred means for impregnating the beads is by placing the beads in a pressure vessel under 6 MPa pressure and at 10° C. and then filling the pressure vessel with liquid $CO_2$ until the PLA beads are submerged. The PLA granules are left submerged in the liquid $CO_2$ until the carbon dioxide-PLA absorption equilibrium is substantially attained. Going to equilibrium results in the $CO_2$ blowing agent being dispersed evenly throughout the impregnated bead resulting in more even foaming and better cell structure when compared to other known processes that only take the beads to about 10 or 12 wt. %.

Achieving equilibrium takes approximately 30-90 minutes when using NatureWorks™ PLA Polymer 4060D™ (NatureWorks LLC, USA), a commonly available commercial amorphous grade but may take longer or shorter depending on the size of the beads and the grade and composition of the beads. After substantially achieving equilibrium at the preferred temperature and pressure ranges, the beads comprise about 18-35% $CO_2$ by weight. When using NatureWorks™ PLA Polymer 4060D™ and $CO_2$ at 6 MPa and 10° C. equilibrium results in the beads having around 30 wt. % $CO_2$.

The liquid $CO_2$ is then removed (and can be recycled for re-use for impregnating the next batch of beads), and the pressure released until it reaches the ambient pressure. In other embodiments of the invention the beads may be retained and/or stored under higher than ambient pressure. The impregnated beads are then stored at a temperature below the minimum foaming temperature. The minimum foaming temperature will depend on the given pressure and the amount of $CO_2$ in the PLA-$CO_2$ matrix as $CO_2$ has the effect of lowering the glass transition and minimum foaming temperatures. At atmospheric pressure the beads must be stored in a refrigerated condition. A standard freezer at −18° C. or −20° C. is generally sufficient. In those conditions, in the first 24 hrs of storage, approximately 50%-75% of the $CO_2$ may be desorbed from the beads. Subsequently, the $CO_2$ loss reduces to a very moderate rate and the beads may be stored in a freezer for several weeks before being further processed.

For expansion (often referred to as "foaming"), the preferred $CO_2$ concentrations are in the vicinity of 5 to 18 wt. % and around 10 wt. % is preferred.

The $CO_2$ released during this storage time can be collected and compressed for re-use within the impregnation process.

The impregnated beads may be pre-expanded immediately, stored then pre-expanded, pre-expanded then moulded (expanded and fused), moulded immediately, or stored then moulded. Absorbed $CO_2$ has the effect of reducing the glass transition temperature and therefore the amount of absorbed $CO_2$ affects the minimum foaming temperature of PLA.

Pre-expansion is conducted at different temperatures and for different times according to the individual foaming characteristics of impregnated beads which in turn depends on blend and $CO_2$ percentage and the differences in minimum foaming temperatures that are the consequence of these factors. Preferably the pre-expansion is conducted at temperatures ranging from 20° C. to 110° C. at ambient pressure and more preferably commercially available amorphous PLA beads having been impregnated to about 30 wt. %-$CO_2$, refrigerated until the $CO_2$ percentage reduces to 5-12%, and pre-expanded at 50-70° C. The pre-expansion step generally results in up to about 85-95%, preferably about 90%, of possible expansion. The purpose of this step is to expand the beads before the mould is sealed. Moulding without pre-expansion may require longer mould residence times and therefore may be less desirable.

In many regards the pre-expansion and fusing stages of the present invention are similar to the well known Expanded Polystyrene ("EPS") process and to known methods of foaming and moulding PLA. There is one significant difference. EPS and known PLA methods require a certain time period (called stabilization, aging, or the like) after pre-expansion but before fusing during which the pre-expanded beads are subjected to ambient conditions (sometimes with reduced humidity) to remove negative pressure within the foam pores, thus improving fusion during the subsequent moulding.

A consequence of this is the loss of blowing agent and the pre-expanded beads generally require re-impregnation with blowing agent or some other gas before being inserted into a mould and fused. The method of the present invention does not require a "stabilization period" or re-impregnation. Rather, any prolonged time-period between pre-expansion and fusing reduces the quality and extent of the fusion.

The pre-expanded beads are promptly transferred into a mould and steam (or other heating providing a temperature greater than the pre-expansion temperature) is applied to further expand the beads and fuse them together in the mould. A vacuum may also be applied before cooling and removal from the mould. The mould is preferably adapted to produce a moulded product including moulded blocks and shaped moulded products, especially blocks adapted to form packing material and shaped moulded products in the form of packaging material or convenience items such as packaging and storage products. Preferred convenience items include containers such as clamshell containers, pots, boxes, bowls, cups, plates and trays.

A person skilled in the art will be aware that the absorption percentages, temperatures and pressures can be manipulated relative to each other at the different stages of the method of the invention to achieve substantially the same result with the major limiting factors being the preference for keeping the $CO_2$ weight percentage within or close to the optimum range of percentages, avoiding the excessive formation of dry ice in the pressure vessel, and retaining control of the foaming steps.

Various aspects of the invention will now be illustrated in non-limiting ways by reference to the following example.

EXAMPLES

General Protocol

Unless otherwise stated, the following general protocol was followed. The Polylactic acid material (NatureWorks LLC, USA) was pre-dried using an oven at 45° C. overnight. Other drying procedures are equally applicable as are commonly used in plastic, foam or other polymer processing. The PLA material, typically as pellets or particles, was placed in a pressure vessel suited to withstand the required pressure and temperature ranges. In some experiments, the size of the beads was altered from the commercial format and/or fillers or other additives were included (e.g. zinc stearate (a nonstick additive), talc, calcium carbonate, bark, clay, or zeolite) Liquid $CO_2$ was introduced into the vessel to the required pressure (e.g. about 5-8 MPa) or amount. The vessel was heated to the required temperature (e.g. 5-15° C.). After a period of a few minutes or after the pressure had stabilized, additional $CO_2$ was added or $CO_2$ was released as necessary to achieve the target pressure for impregnation with liquid carbon dioxide (e.g. about 5-8 MPa). After the period of time for impregnation (e.g. about 10 to 240 minutes, optionally longer—overnight, for example) $CO_2$ pressure was released and the vessel removed from temperature control. The impregnated beads were weighed before and after impregnation to calculate % $CO_2$ by weight.

In some cases, the impregnated beads were used directly in an integrated moulding process with or without pre-expansion. Alternatively, the impregnated beads were stored in refrigerated conditions, for example in a standard freezer at −18° C., and then subjected to pre-expansion and moulding or moulding without pre-expansion.

The impregnated beads, either directly after impregnation or later after storage, are then fused by application of heat in suitable mould. A pre-expansion step may be used to pre-expand the beads before expansion and fusing. The pre-expansion step may be conducted before the beads are introduced to the mould or may be conducted in the mould. The pre-expansion step involves heating the impregnated beads for a short period (e.g. about 5 to 120 seconds) at a suitable temperature (19-110° C. for example).

Once impregnated or pre-expanded beads are added to the mould, a combination of steam heating (about 50 to 100° C., for about 5 to 120 seconds for example) and optional vacuum (for about 1 second to 10 minutes for example) was applied to expand and fuse the beads. Steam and optionally vacuum are applied for a short time (e.g. 2 to 10 minutes) to fuse the impregnated beads and fill to the mould shape, to make a foam block of uniform foam structure. Cooling may be applied before de-moulding, using water cooling of the mould for example. Average block density can be readily calculated from the weight and dimensions of the block. Block density is preferably measured 48 hours after moulding by which time the $CO_2$ levels have stabilized.

All references to % $CO_2$ concentrations in the examples are references to percent $CO_2$ by weight relative to the combined weight of the PLA material and $CO_2$.

Example 1

Commercial PLA beads and blends of commercial PLA beads were inserted into a pressure vessel (impregnation equipment) with the beads in close contact. No stirring nor dispersion medium nor stabilizing agents were used. The PLA resin beads used were NatureWorks™ (NatureWorks LLC, USA) PLA Polymer 4060D™.

Subsequent runs were conducted using 5:1 and 1:1 blends of NatureWorks™ PLA Polymer 4060D™ (amorphous) and NatureWorks™ PLA Polymer 3001™ (highly crystalline) (NatureWorks LLC, USA).

The pressure vessel was filled with liquid $CO_2$ and PLA beads submerged under 6 MPa pressure and at 10° C. The PLA granules were left submerged in the liquid $CO_2$ for approximately 90 minutes until reaching ($CO_2$ absorption) equilibrium. After 90 minutes the PLA beads and $CO_2$ achieved equilibrium with the PLA beads incorporating around 30 wt. % $CO_2$.

The liquid $CO_2$ was removed and the pressure released until it reached ambient. The impregnated beads were stored in a freezer (at −20° C.) for 24 h. During this time 50%-75% of the $CO_2$ was desorbed from the beads. Subsequently, the $CO_2$ loss reduced to a very moderate rate. The beads were stored in the freezer for a month before being further processed.

After storage the beads having 10 wt. % $CO_2$ were pre-expanded at temperatures of 50-70° C. Without a re-impregnation step, the beads were directly transferred and blown into a mould and then further expanded and fused in the mould. A water boiler in combination with a water-ring vacuum pump provided the steam at required temperatures and pressures and vacuum pump provided vacuum. After applying steam and vacuum the mould was water cooled for one minute. The mould was dismantled to remove the moulded product. The moulded product of fused foamed (expanded) PLA beads consisted of consistently expanded and fused beads with substantially uniform foam structure and fully filled the mould.

Example 2

Expansion Test, PLA 4060D™ Liquid Impregnation for 30 Min

PLA 4060D™ beads were impregnated at 10° C., 6 MPa pressure for 30 min as per the protocol above. Average $CO_2$ concentration of the beads after impregnation was 25.46% by weight.

Hard core* was found, when tried to foam immediate after impregnation and 27 h after storing in freezer, in hot water at different temperatures (20° C., 50° C. and 80° C.). The hard core disappeared when the beads were stored in the freezer for 45 h and foamed in hot water at 80° C. for 40 seconds. The $CO_2$ concentration of the expanded beads was 6.57%. The beads expanded very well and had a density of 38 g/l.

Hard core: Unfoamed solid polymer remaining at the centre of the bead after foaming. Due to unfoamed solid polymer, the density of the foam bead will be higher. When the hard core disappears and the whole bead foams, the density will be lower

Example 3

Expansion Test, PLA 4060D™ Liquid Impregnation for 60 Min

Impregnation of PLA 4060D™ beads was performed at 10° C., 6 MPa pressure for 60 min as per the protocol. Average $CO_2$ concentration of the beads after impregnation was 29.82%.

Hard core was found, when tried to foam immediate after impregnation and 1 h after storing in freezer, in hot water at different temperatures. The hard core disappeared, after storing in freezer for 18 h and foamed in hot water at 80° C. for 40 s. $CO_2$ concentration of the beads was 13.51%. The beads expanded very well. Density of the beads was 38 g/l.

It was found that sufficient $CO_2$ retention was able to be realized up to at least 48 hrs at −18 C without any other attempts to retain $CO_2$ and good quality expanded beads could be obtained—see Table 1.

TABLE 1

$CO_2$ concentrations after storage at −18° C.

| Time in freezer (hour) | $CO_2$ concentration on removal (wt. %) |
|---|---|
| 0 | 29.82 |
| 1 | 21.82 |
| 18 | 13.51 |
| 25 | 12.59 |
| 42 | 11.24 |
| 48 | 10.87 |

Example 4

Expansion Test, PLA 4060D™ Liquid Impregnation for 90 Min

Impregnation of PLA 4060D™ beads was carried out at 10° C., 6 MPa pressure for 90 min as per the protocol. Average $CO_2$ concentration of the beads after impregnation was 30.30%.

Impregnated beads were expanded immediately after impregnation using hot water at 50° C. for 40 s or at 80° C. for 1 min.

Impregnated beads were also stored in a freezer and the average $CO_2$ concentration of the beads after storage in the freezer for 19 hr was 13.73% and the average $CO_2$ concentration of the beads after storage in the freezer for 42 hr was 11.83%.

All such beads could be expanded at 80° C. for 1 min. The average density of these beads was 35 g/l.

Example 5

Block Production, PLA 4060D™ Larger Beads and Liquid Impregnation

PLA 4060D™ beads were first extruded on a standard laboratory twin screw extruder into cooled strands (air cooled) and pelletized into larger pellets than typically received in commercial PLA material. The extruded pellets were about 4-6 mm, compared to those typically received from NatureWorks LLC that were about 3-4 mm). These larger beads were dried and impregnated at 10° C., 6 MPa pressure for 3 hr as per the above examples and protocol. The average $CO_2$ concentration of the beads was 27.63%.

A block was made after storing impregnated beads in a freezer for 43 h as per the protocol above. The $CO_2$ concentration of the beads after storage was 12.78%. Impregnated beads were pre-expanded in hot water at 70° C. for 90 s and fused together in a metal mould by applying steam at 86° C. for 90 s. The average density of the block was ~30 g/l.

Example 6

Block Production, PLA 4060D™ Smaller Beads and Liquid Impregnation

PLA 4060D™ beads were extruded and pelletized to make smaller beads. Cooled (water cooled) strands of extruder polymer were collected and pelletized (1-2 mm) (compared to those from NatureWorks of 3-4 mm). The smaller beads were dried at 45° C. overnight. Optionally a small amount (for example in this case, 0.140%) of anti-stick additive such as zinc stearate could be added prior to impregnation, or during extrusion. Impregnation was carried out at 10° C., 6 MPa pressure for 2 hr as per the protocol. The average $CO_2$ concentration of the beads was 29.31%.

A moulded block was made after storing impregnated beads in the freezer for 17 hrs as per the above protocol. The $CO_2$ concentration of the beads after storage was 11.62%. Impregnated beads were pre-expanded in hot water at 69° C. for 1 min and fused together in a metal mould by applying steam at 80° C. for 20 s. The block formed was very good and its density was ~42 g/l.

Example 7

Block Production, PLA 4060D™ and PLA 8302D™ Liquid Impregnation

Dried PLA 4060D™ or PLA 8302D™ (amorphous) beads were impregnated at 10° C., 6 MPa pressure for 2 h as per the protocol above. The average $CO_2$ concentration of the beads was 32.42% and 31.03% for PLA 4060D™ and PLA 8302D™ impregnated beads respectively. Fused blocks were made from impregnated beads after storing in the freezer for 22 h and for 46 hrs as follows.

PLA 4060D™ (after 22 h in freezer) exhibited an average $CO_2$ concentration of 13.18% and impregnated beads were pre-expanded at 70° C. for 40 s, and then fused at 80° C. (65 s) with steam and vacuum (5 min). The block formed was cooled with tap water. The density of the fused block was ~44 g/l. The mould was fully filled and the block was good.

PLA 8302D™ (after 22.50 h in freezer) exhibited an average $CO_2$ concentration of 13.40%. The impregnated beads were pre-expanded at 70° C. for 40 s, and then fused in a mould at a steam temperature of 80° C. for 65 s, with applied vacuum and then cooling (ambient water). Block density was ~44 g/l. The mould was not fully filled.

PLA 4060D™ beads (after 46 h in freezer) exhibited a $CO_2$ concentration of 11.24%. The impregnated beads were pre-expanded at 70° C. for 50 s and then fused in a mould at a steam temperature of 80° C. for 75 s, with application of vacuum and subsequent cooling to make a fused foam block. The mould was fully filled and the block looked good.

PLA 8302D™ (after 46.50 h in freezer) exhibited a $CO_2$ concentration of 11.63%. Impregnated beads were pre-expanded at 70° C. for 50 s and then successfully fused in a mould as above at 80° C. for 75 s. The mould was not fully filled.

Example 8

Block Production, PLA4060D™ 75° C. Moulding

PLA 4060D beads were impregnated at 10° C., 60 bar pressure for 4 hours as per the protocol above. The average $CO_2$ concentration of the beads after impregnation was 28.08%.

The beads were then stored in a freezer for 48 h. The average $CO_2$ concentration of the beads after storing was 11.21%. The impregnated beads were then pre-foamed in hot water at 80° C. for 15 seconds and then fused using steam at 75° C. for 1 minute, followed by 6 minutes vacuum and 1 minute cooling.

The beads were fused together well and the block was good. The density of the foam block was 55 g/l.

Example 9

Block Production, 10-30% Talc by Weight Extruded with PLA 4060D™

10, 20 or 30% talc (by weight of the talc and PLA) was compounded with PLA 4060D™ using extrusion compounding. Air cooled strands were pelletized and dried in an oven at 45° C. overnight prior to impregnation at 10° C., 6 MPa pressure for 2.5 h as per the protocol. The average $CO_2$ concentration of the beads was 25.80%, 2519% and 23.42% for 10%, 20% and 30% beads respectively. Impregnated beads were pre-expanded at 70° C. and fused together using steam at 80° C. in a metal mould as per the protocol. The block comprising 10% talc was of good quality and consistency. The beads comprising 30% talc shrunk and did not fuse during moulding.

For 10% talc extruded with PLA 4060D™, the $CO_2$ concentration after 26 h in freezer was 10.59%. The beads were pre-expanded at 70° C. for 40 s and Fused in a mould at 78° C. for 65 s. The density of the block was 53 g/l Similarly 20% talc was extruded with PLA 4060D™ impregnated as above and stored (26 h in freezer). The $CO_2$ concentration after 26 h in the freezer was 10.69%

Beads were pre-expanded at 70° C. for 40 s. Moulding was at 80° C. for 65 s. Although some shrinkage of expanded beads had occurred good quality fused blocks could be made. The density of the blocks after 24 hr at 45° C. and 24 hr at room temperature was 46 g/l.

10% talc extruded with PLA 4060D™ (after 48 h in freezer). The $CO_2$ concentration after 48 h in the freezer was 10.59%. Beads were pre-expanded at 70° C. for 40 s and moulded successfully at 79° C. for 55 s. The block was good and the density of the block was 59 g/l after 24 hr at 45° C. and 24 hr at room temperature.

Example 10

Block Production, Calcium Carbonate Extruded with PLA 4060D™

10% or 20% calcium carbonate (by weight of the calcium carbonate and PLA) was compounded with PLA 4060D™ using extrusion. Air cooled strands were pelletised and dried in an oven at 45° C. overnight prior to impregnation at 10° C., 6 MPa pressure for 3 hr as per the protocol. The average $CO_2$ concentration of the beads following impregnation was 25.62% and 24.80% for 10% and 20% extrusion compounded granules of calcium carbonate with PLA 4060D™ respectively. Foam blocks were made as per the protocol as follows.

10% calcium carbonate beads had a $CO_2$ concentration after 24 h in the freezer of 11.82%. Beads were pre-expanded at 70° C. for 30 s and moulded at 79° C. for 55 s. The density of the block after 24 hr in a 45° C. oven was 56.3 g/l. The block was good.

10% calcium carbonate beads had a $CO_2$ concentration after 24 h in the freezer of 11.43%. Beads were pre-expanded at 70° C. for 30 s and moulded at 79° C. for 55 s with application of vacuum for 6 minutes and water cooling. The density of the block after 24 hr in a 45° C. oven was 53.9 g/l. The block was good.

20% calcium carbonate beads had a $CO_2$ concentration after 24 h in the freezer of 10.17%. Beads were pre-expanded at 70° C. for 20 s and moulded at 78° C. for 50 s with vacuum for 6 minutes and water cooling. The density of the block after 24 hr in a 45° C. oven was 67.89 g/l. The block was acceptable.

Example 11

Block Production, Pine Bark and PLA 4060D™

10% and 20% ground pine bark (by weight of the bark and PLA) were blended with PLA 4060D™ using extrusion compounding. Air cooled strands were pelletised and dried in an oven at 45° C. overnight prior to impregnation at 10° C., 6 MPa pressure for 2.5 hr as per the protocol. The average $CO_2$ concentration of the beads was after impregnation was 26% and 27.5% for 10% and 20% extrusion compounded granules of bark with PLA 4060D™ respectively. Blocks were moulded according to the protocol as follows.

10% bark beads had a $CO_2$ concentration after 24 h in the freezer of 11.25%. Beads were pre-expanded at 70° C. for 25 s and then moulded at 78° C. for 55 s. The expanded block was good quality and had a density (after 48 hr) of 38 g/l. Other beads were pre-expanded at 70° C. for 15 s and then moulded at 79° C. for 60 s. The expanded block was good quality and had a density (after 48 hr) of 49 g/l.

20% bark beads had a $CO_2$ concentration after 24 h in the freezer of 11.16%. The beads were pre-expanded at 70° C. for 10 s and then moulded at 79° C. for 40 s. Vacuum was applied for 6 min. The expanded block was good quality and had a density (after 48 hr) of 66 g/l. Other beads were pre-expanded at 70° C. for 13 s and then moulded at 77° C. for 43 s. The expanded block was good quality and had a density (after 48 hr) of 56 g/l.

Example 12

Block Production, Clay and Zeolite-PLA Compounds

5% clay or 10% zeolite (by weight of the clay and/or zeolite and PLA) were blended with PLA 4060D™ using extrusion compounding. Air cooled strands were pelletized and dried in an oven at 45° C. overnight prior to impregnation at 10° C., 6 MPa pressure for 3 h as per the protocol. The average $CO_2$ concentration of the beads was 35.56% and 33.40% for 5% and 10% extrusion compounded granules of 5% clay and 10% zeolite with PLA 4060D™ respectively.

The beads expanded well, again with a fine cell structure, after storing in a freezer (−18° C.) for 48 hr.

INDUSTRIAL APPLICATION

The methods and compositions of the present invention have utility in packaging applications.

Those persons skilled in the art will understand that the above description is provided by way of illustration only and that the invention is not limited thereto.

What is claimed is:

1. A method of forming a composition comprising impregnated polylactic acid (PLA) resin beads, the method comprising impregnating PLA resin beads with $CO_2$ by contacting the beads with liquid $CO_2$; and holding the impregnated beads at a temperature and pressure that prevents the beads from foaming while allowing the level of impregnated $CO_2$ to reduce to about 4 to 20 weight % relative to the total weight of the beads and $CO_2$.

2. A method of manufacturing a moulded polylactic acid (PLA) product, the method comprising introducing the beads of claim 1 into a mould; and expanding and fusing the beads in the mould.

3. A method of manufacturing a moulded polylactic acid (PLA) product, the method comprising pre-expanding the beads of claim 1 at a pre-expansion temperature, introducing the beads into a mould; and further expanding and fusing the beads in the mould by application of a temperature greater than, or less than or equal to the temperature used for pre-expansion.

4. A method of forming a composition comprising expanded polylactic acid (PLA) resin beads, the method comprising
   (1) providing a composition comprising impregnated PLA beads prepared by a process comprising
   (a) impregnating PLA resin beads with $CO_2$ by contacting the beads with liquid $CO_2$;
   (b) holding the impregnated beads at a temperature and pressure that prevents the beads from foaming while allowing the level of impregnated $CO_2$ to reduce to about 4 to 20 weight % relative to the total weight of the beads and $CO_2$; and
   (2) pre-expanding the beads at a pre-expansion temperature.

5. A method of manufacturing a moulded polylactic acid (PLA) product, the method comprising introducing the beads of claim 4 into a mould and further expanding and fusing the beads in the mould by application of a temperature greater than the temperature used for pre-expansion.

6. A method of manufacturing a moulded polylactic acid (PLA) product, the method comprising introducing the beads of claim 4 into a mould; and further expanding and fusing the beads in the mould by application of a temperature less than or equal to the temperature used for pre-expansion.

7. A method of claim 4 wherein impregnation is conducted until the percentage of $CO_2$ absorbed by the beads is at least about 18% by weight relative to the weight of the $CO_2$ and the beads.

8. A method of claim 4 wherein impregnation is conducted by contacting the PLA resin beads with liquid $CO_2$ at a pressure of about 5-8 MPa and a temperature of about 2-15° C. for about 10 to 240 minutes.

9. A method of claim 4 wherein following impregnation of the beads the pressure is reduced to ambient pressure and the beads are held at a temperature of less than about 4, 2, 0, −2, −4, or −6° C.

10. A method of claim 4 wherein following impregnation of the beads the pressure is reduced to ambient pressure and the beads are held at a temperature of less than about −8, −10, −12, −14, −16, or −18° C.

11. A method of claim 4 wherein following impregnation of the beads the pressure is reduced to ambient pressure and the beads are held until the $CO_2$ weight % decreases to about 20, 19, 18, 17, 16, 15, 14, 13, 12, 11, 10, 9, 8, 7, 6, 5, or 4% by weight.

12. A method of claim 4 wherein optionally pre-expanding the beads is conducted at a temperature of about 19 to 110° C. for about 5 to 120 seconds.

13. A method of claim 4 wherein the PLA resin beads comprise at least about 50, 60, 70, 80, 90, 95, 99 or 100% PLA by weight.

14. A method of claim 4 wherein the PLA is amorphous PLA.

15. A method of claim 4 wherein the PLA resin beads further comprise a filler.

16. A method of claim 4 wherein the PLA beads further comprise a filler selected from talc, calcium carbonate, calcium stearate, clay, zeolite, bark, sawdust, borax, zinc borate, aluminium hydroxide, or any mixture of any two or more thereof.

17. A method of claim 1 wherein impregnation is conducted until the percentage of $CO_2$ absorbed by the beads is at least about 18% by weight relative to the weight of the $CO_2$ and the beads.

18. A method of claim 1 wherein impregnation is conducted by contacting the PLA resin beads with liquid $CO_2$ at a pressure of about 5-8 MPa and a temperature of about 2-15° C. for about 10 to 240 minutes.

19. A method of claim 1 wherein following impregnation of the beads the pressure is reduced to ambient pressure and the beads are held at a temperature of less than about 4, 2, 0, −2, −4, or −6° C.

20. A method of claim 1 wherein the impregnated beads are held at a temperature and pressure that prevents the beads from foaming while allowing the level of impregnated $CO_2$ to reduce to about 5 to 18 weight % relative to the total weight of the beads and $CO_2$.

21. A method of claim 1 wherein impregnation is conducted until the percentage of $CO_2$ absorbed by the beads is at least about 20% by weight relative to the weight of the $CO_2$ and the beads.

22. A method of claim 1 wherein impregnation is conducted until the absorption of $CO_2$ by the beads reaches equilibrium.

23. A method of claim 4 wherein the impregnated beads are held at a temperature and pressure that prevents the beads from foaming while allowing the level of impregnated $CO_2$ to reduce to about 5 to 18 weight % relative to the total weight of the beads and $CO_2$.

24. A method of claim 4 wherein impregnation is conducted until the percentage of $CO_2$ absorbed by the beads is at least about 20% by weight relative to the weight of the $CO_2$ and the beads.

25. A method of claim 4 wherein impregnation is conducted until the absorption of $CO_2$ by the beads reaches equilibrium.

* * * * *